United States Patent Office 3,297,531
Patented Jan. 10, 1967

3,297,531
COMPLEXES OF TRIVALENT ANTIMONY WITH PENICILLAMINE, AND ADMIXTURES OF EXCESS PENICILLAMINE WITH SAID COMPLEXES
Ernst A. H. Friedheim, 333 W. 52nd St., New York, N.Y. 10019
No Drawing. Filed Dec. 11, 1963, Ser. No. 329,898
14 Claims. (Cl. 167—68)

This invention relates to novel therapeutically active compositions of matter consisting of (a) complexes of trivalent antimony and penicillamine or its salts, said complexes corresponding to the formula

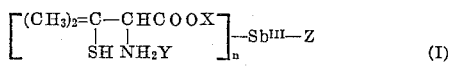
(I)

wherein $n$ stands for an integer of 2–5, X stands for H or a salt-forming inorganic or organic cationic radical, and Y may be absent or present and, if present, stands for a therapeutically applicable inorganic or organic monobasic acid, preferably HCl. Z stands for OH or an anionic grouping, such as Cl, —$OCH_3$, —$OC_2H_5$, —$COCH_3$, (b) said composition of matter containing, if desired, also penicillamine or its therapeutically applicable salts in mixture with said complexes.

It has been found that complexes corresponding to the above Formula I and mixtures of said complexes with penicillamine or its salts are distinguished by relatively high tolerance and therapeutic effects in the treatment of protozoan and helmintic infections, such as trypanosomiasis, leishmaniasis, filariasis, onchocerciasis, and schistosomiasis.

In complexes of the invention, the value of $n$ ranges from 2 to 5 and Y is present or absent and stands preferably for HCl.

The complexes embodying the present invention can be prepared by mixing the organic component shown in the above Formula I with a suitable compound of $Sb^{III}$ in a liquid reaction medium. Thereby said organic component can be used in the form of the free carboxylic acid, or inorganic or organic salts of the carboxyl group and in form of derivatives in which Y stands for a monovalent acid. The antimony can be used e.g. in the form of $Sb_2O_3$, $Sb(OH)_3$, $SbOCl$, $SbCl_3$, $Sb(OCH_3)_3$, $Sb(OC_2H_5)$, $Sb(COCH_3)_3$ Suitable reaction media are water and organic solvents, depending on the choice of the reactants, as will appear from the following examples. The reaction temperature may vary in the range of 20–120° C.

Aqueous reaction mixtures may be suitable for medical application without isolation of the products present in the reaction solution, or the products may be isolated from their solutions according to standard methods including evaporation, preferably at reduced pressure and low temperatures, e.g. according to the method known as lyophilization or freeze-drying, or by precipitation of the reaction mixture with organic solvents, by salting out, or by crystallization.

Example 1

29.9 g. of D-penicillamine (0.2 mol) and 14.6 g. of $Sb_2O_3$ (0.5 mol) are stirred with 300 ml. of water with the addition of a dilute e.g. 10%, aqueous NaOH solution up to a substantially neutral or slightly alkaline pH at a temperature of 60° C. until most of the suspended material has gone into solution. The reaction mixture is filtered, if desired, through a bacterial filter, under aseptic precautions. The resulting clear filtrate may be used for medical application, after adjustment to the desired concentration.

Alternatively a solid product useful for medical application may be isolated (a) by evaporation of the filtered reaction mixture under reduced pressure and low temperature, e.g. 0.01 mm. Hg at —5° C., to dryness. The use of lyophilization or freeze-drying is thereby preferred. (b) By precipitation by the addition of a water-soluble organic solvent, preferably ethanol or isopropylalcohol, followed by filtration and drying in vacuo. (c) By "salting out" by saturation of the reaction mixture with a neutral salt, e.g. sodium acetate, isolation of the precipitated reaction product, washing with a small quantity of water and several portions of ethanol, followed by drying in vacuo.

The products isolated in this way are complexes of sodium salts of D-penicillamine and the $Sb^{III}$-radical in the molar proportion of 2:1. They are soluble in water, insoluble in methanol, ethanol, acetone, ether, chloroform. They are precipitated from their aqueous solution by acetic acid, careful acidification with mineral acids, but soluble in an excess of mineral acids. They may be purified by precipitation with acetic acid, as described in the following Example 2.

Example 2

10 g. of D-penicillamine hydrochloride and 4.5 g. of SbOCl are stirred with 50 ml. water at 35° C. with addition of sodium bicarbonate, until most of the suspended material goes into a solution of a substantially neutral pH. On acidification of the filtered reaction mixture with acetic acid a precipitate is formed, filtered off, washed with dilute acetic acid, dissolved in 5 volumes of water with addition of aqueous ammonia to a pH of 7–8. In addition of isopropylalcohol to the filtered solution a crystalline precipitate is formed, which is filtered off, washed with isopropylalcohol, isopropylether and dried in vacuo. It corresponds to the following formula:

$$(C_5H_{10}O_2NS)_2SbOH \qquad (II)$$

Calculated: C, 27.40; H, 4.86; N, 6.44; Sb, 27.98; S, 14.74%. Found: C, 27.60; H, 4.47; N, 6.22; Sb, 27.99; S, 14.26%.

The antimony containing complex of the Formula II can be converted into its sodium salt by dissolving it in the calculated amount of aqueous $NaHCO_3$, followed by precipitation with alcohol or evaporation to dryness, under reduced pressure and low temperature.

The products obtained according to the above Examples 1 and 2 contain 2 mols of D-penicillamine for one atom of $Sb^{III}$. Further compositions of matter suitable for medical application can be obtained by proceeding in the manner described in the above Example 1, but using more than 2 and up to 6 mols of D-penicillamine for one atom of $Sb^{III}$. Thereby mixtures of complexes with an excess of the complex-former are obtained.

Example 3

44.7 g. of D-penicillamine (0.3 mol) are stirred with 223 ml. of water of 40° C. and a paste containing 17.3 g. (0.1 mol) of freshly precipitated $Sb(OH)_3$ with addition of sodium bicarbonate to a substantially neutral reaction to form a nearly clear solution, which after filtration through bacterial filters and adjustment to the desired concentration is suitable for medical application. Water soluble solid products can be obtained from the reaction mixture in the manner described in the above Example 1.

Using in this example 59.6 g. and 64.5 g. of D-penicillamine, respectively, and the above described amount of $Sb(OH)_3$, solution and products can be obtained which contain 4 or 5 mols, respectively, of D-penicillamine, for one atom of $Sb^{III}$, and are suitable for medical application. These are mixtures of the complex with an excess of the organic complex former.

In the above examples NaOH and NaHCO₃ may be replaced by other inorganic or organic basic compounds, such as KOH, KHCO₃, LiOH, ammonia, alkylamines, hydroxyalkylamines, and as monoethanolamine, n-methyl-glucamine( hexyldiarnine and the like.

It has been found that in suitable organic solvents penicillamine, as well as penicillamine hydrochloride likewise form complexes with trivalent antimony compounds in molar proportions of 3–5 mols penicillamine (or its hydrochloride) to one mol Sb$^{III}$-halide, such as SbCl₃. These complexes dissolve in water with formation of CHl and the resulting solutions are suitable after neutralization for medical application.

*Example 4*

2.8 g. of SbCl₃ and 6.7 g. of penicillamine hydrochloride are heated in 25 ml. glacial acetic acid for 15 minutes to 110° C. After cooling an addition of 75 ml. of chloroform and 75 ml. of CCl₄ a resinous material separates and becomes crystalline on standing. The water-clear crystals are filtered off, washed with chloroform and dried in vacuo. The resulting product produces in water a precipitate which dissolves on addition of alkali, such as ammonia, sodium bicarbonate, sodium hydroxide, to a pH of 7. It is soluble in hot ethylacetate and has the probable structure of (penicillamine hydrochloride)₃ SbCl₃.

*Example 5*

20 g. of SbCl₃ are stirred with 48 g. of penicillamine hydrochloride in 130 ml. of propylacetate at 100° C., until a bottom layer of a clear syrup is formed, with crystallizes upon cooling. The crystals are filtered, washed with ethyl-propionate and dried in vacuo. They have the probable structure (penicillamine hydrochloride)₄-SbCl₃.

This complex is soluble in water, giving a blue reaction to congo red. It is soluble in dilute ammonia, aqueous solutions of alkali bicarbonate, soda, caustic alkali, and glacial acetic acid. The neutral or alkaline aqueous solution is precipitated by acetic acid and the acid solution in water is precipitated by sodium acetate. It is soluble in methanol, ethanol, acetone, insoluble in ether and chloroform. The solution in water is suitable for medical application after adjustment to substantially neutral pH and to the desired concentration and sterilization by filtration.

*Example 6*

48 g. of D-penicillamine and 20 g. of SbCl₃ are stirred with 400 ml. ethylpropionate at 100° C. for 40 minutes. The resulting resin is separated by decantation from the supernatant liquid, washed with ethyl acetate and triturated with petroleum ether. The resulting powder is filtered off, washed with petrolether and dried in vacuo.

It is soluble in water at a pH of approximately 2 and again at a pH of 6–12. It is insoluble in ether and chloroform. It has the probable constitution of (penicillamine)₅·SbCl₃.

It will be understood from the above that the complexes embodying the present invention, as well as their mixtures with penicillamine and/or its salts, are of valuable utility due to their favorable therapeutic effects. Experimental and clinical tests have shown that these complexes and mixtures can be successfully used in protozoan and helmintic infections, such as trypanosomiasis, leishmaniasis, filariasis, onchocerciasis and schistosomiasis. The toxicity of the various complexes in neutral aqueous solution is relatively low, of the order of 100–250 mg./kg. for the LD/50 intraperitoneally in white mice. The medical application is preferably carried out by intramuscular injections with neutral aqueous solutions of the complexes and mixtures embodying the present invention. Thereby the clinical doses of single injections vary between 0.1 to 1.0 mg./kg. Sb and the injections may be given once a day on consecutive days, if desired with intervals of one or more days.

The use of an excess of the organic complex former in the compositions of the present invention brings about an increase of tolerance and of the stability of the compositions.

In preparing salts of the complex, former acids are used which have no toxic or other adverse effects on the therapeutic application of the compositions of the invention and such acids are sometimes denoted herein "therapeutically applicable acids." The term "organic complex former" is used sometimes herein to denote the organic compound attached to the Sb-radical in the Formula I.

The parts of percent stated herein are by weight if not otherwise stated.

It will be understood that this invention is not limited to the specific examples described and can be carried out with various modifications. For example, X can stand for ions of K or alkaline-earth metals, such as magnesium or calcium, or of n-methylglucamine, glucoseamine or a lower alkylamine, e.g. methylamine or ethylamine.

What is claimed is:

1. Compositions for the treatment of trypanosomiasis, leishmaniasis, filariasis, onchocerciasis and schistosomiasis, selected from (a) the group consisting of complexes corresponding to the formula

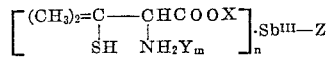

wherein $n$ stands for an integer of 2–5, X is selected from the group consisting of H and salt-forming inorganic and organic cationic radicals, $Y_m$ is selected from therapeutically applicable monobasic organic and inorganic acids and the value of $m$ is selected from 0 and 1; Z is selected from the group consisting of OH and organic and inorganic anionic groupings; and (b) from mixtures of at least one member of (a) with a compound selected from the group consisting of penicillamine and penicillamine salts; and the component b is present in the composition in an amount up to 5 mols for one mol of (a).

2. A therapeutically active composition of matter corresponding to the formula

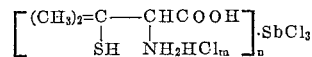

wherein $m$ and $n$ have the meaning defined in claim 1.

3. A therapeutically active composition of matter corresponding to the formula

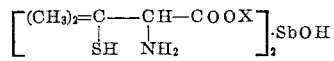

wherein X has the meaning defined in claim 1.

4. A therapeutically active composition of matter, consisting of a mixture of the complex claimed in claim 3 with penicillamine in the amount up to 5 mols for one penicillamine-Sb complex.

5. A therapeutically active composition of matter, consisting of a mixture of the complex claimed in claim 3 with penicillamine hydrochloride, in the amount up to 5 mols for one penicillamine Sb-complex.

6. A therapeutically active composition of matter as claimed in claim 1, in which X stands for Na.

7. A complex as claimed in claim 1, in which X stands for the cation of an alkali metal.

8. A complex as claimed in claim 1, in which X stands for the therapeutically applicable cation of an alkaline earth metal.

9. A complex as claimed in claim 1, in which X stands for n-methylglucamine.

10. A complex as claimed in claim 1, in which X stands for a lower alkylamine.

11. A complex as claimed in claim 1, in which Y stands for HCl.

12. A complex as claimed in claim 1, in which Z stands for —OH.

13. A complex as claimed in claim 1, in which Z stands for —Cl₃.

14. A complex as claimed in claim 1, in which Z stands for —OCl.

References Cited by the Examiner

UNITED STATES PATENTS

| | | | |
|---|---|---|---|
| 2,006,003 | 6/1935 | Schoeller et al. | 260—11 |
| 2,629,724 | 2/1953 | Clemence | 260—446 |
| 2,662,079 | 12/1953 | Friedheim | 260—242 |
| 2,772,303 | 11/1956 | Friedheim | 260—446 |
| 2,880,222 | 3/1959 | Friedheim | 260—430 |

OTHER REFERENCES

Albert, Aposhian (II), Foreman, Fed. Proc. 20(10): 137–147; 185–196 (1961).

Aposhian (I), Science, 128 (3315), page 93, Jan. 13, 1958.

Ch'en Shui-T'ing et al., Chem. Abstracts, 59: 15777a, Dec. 1963.

Chou Chin-Hsu et al., Acta Pharmaceutica Sinica, 7 (7): 259–265, Oct. 1959.

Chou Tsu-Te et al., Acta Pharmaceutica Sinica, 10 (5): 266–278, May 1963.

Chue Ying-Chi et al., Acta Pharmaceutica Sinica, 5 (2): 135–141, June 1957.

Eyring et al., Arthritis and Rheumatism, 6 (3): 216–223, June 1963.

Galla et al., Minerva Dermatologica, 37: 11–13, Jan. 1962.

Jardin, Medecine Tropicale, 19 (6): 703–707, Nov.–Dec. 1959.

Kuchinskas et al., Arch. Biochem. Biophys., 97: 370–372 (1962).

Walshe, Ann. Intern. Med., 53 (5): 1090–1096, Nov. 1960.

LEWIS GOTTS, *Primary Examiner.*

S. K. ROSE, *Assistant Examiner.*